Feb. 17, 1953   J. A. SEEDE   2,629,062
POWER TRANSMISSION
Filed Oct. 26, 1950

INVENTOR
JOHN A. SEEDE

BY *John B. Armentrout*

ATTORNEY

Patented Feb. 17, 1953

2,629,062

UNITED STATES PATENT OFFICE 2,629,062

POWER TRANSMISSION

John A. Seede, Schenectady, N. Y.

Application October 26, 1950, Serial No. 192,321

11 Claims. (Cl. 310—96)

This invention relates to power transmissions and more particularly to an electromagnetic coupling for connecting a source of power to its load.

As conducive to a clearer understanding of certain features of the present invention, it may be noted at this point that torque transmitting devices are widely used for coupling a source of power or a prime mover to a driven shaft which is to operate under varying loads and speeds. One common form of torque transmission makes use of change speed gearing in which a plurality of gears are selectively employed for transmitting torque to the driven shaft, the gear ratios being selected for several predetermined speeds and torque ratios. The present standard gear box transmission for automobiles gives three speeds forward and one speed reverse, one popular small car using the folowing ratios of engine and propeller shaft speeds forward: Low speed ratio of 2.57 to 1.00, intermediate speed ratio of 1.83 to 1.00, and high speed ratio of 1.00 to 1.00. This one to one ratio for high speed is designed to enable an automobile to negotiate a very large percentage of grades met on major highways without shifting to intermediate speed. This means, then, that, for a great deal of the driving time on the level, the engine speed is higher than necessary, and the overall efficiency of the vehicle is very poor. To overcome this handicap, optional overdrives are available at considerable extra cost. These overdrives operate at approximately 30% above high speed with a gear ratio of .77 to 1.00. However, even the overdrive does not give the flexibility of operation that is most desirable. Certain transmissions of the gear type suffer from two disabilities: the gears must be changed or "shifted" to obtain the desired ratios and the power source must be isolated from the load during shifting by means of a friction clutch or the like. More recent developments in this field make use of various types of fluid couplings which elastically connect the driving and the driven shafts throughout a range from high torque and low speed to low torque and high speed without need for shifting or interruption. Many of the fluid-type couplings operate on the impeller principle and for this purpose fluid is housed between the adjacent ends of the driving and driven shaft and between the impelling and the impelled components of the device. Among the difficulties introduced by the use of this type of coupling are that the fluid must be kept under pressure, as high as 90 lbs. per square inch, which makes the provision of adequate seals a considerable problem and that a large amount of fluid, as much as 11 quarts, must be used which introduces considerable bulk, and weight. Some work has been done in the field of electromagnetic couplings, but a practical device of this type has not been found for several reasons. Principally, the complications introduced into previously-conceived devices of this type made for frequent break-down. While the general idea of transmitting power by use of an electromagnetic flux in place of a fluid affords highly favorable aspects, many devices of this character heretofore employed embody intricate electrical systems which are unduly expensive to produce and are difficult to maintain. A variety of electromagnetic coupling devices in the prior art offer a problem with respect to installation in a minimum amount of space, and fail to lend themselves to compact construction. In certain instances, the components of these units are brought together for compactness, but with resulting losses in efficiency of operation for such reasons as electrical and magnetic interference.

Accordingly, one of the outstanding objects of the present invention is the provision of a simple, compact and reliable electromagnetic coupling which is efficient in operation.

Furthermore, an object of this invention is that of providing a simple, practical, and reliable slip coupling which is capable of transmitting torque from a source of power to a driven shaft by the elastic interconnecting effect of electromagnetic flux.

Another object is the provision of compact and thoroughly reliable electromagnetic torque-transmitting apparatus which has high torque-low speed and low torque-high speed characteristics.

A further object of this invention is the provision of a device of the character indicated which embodies simple and practical electrical apparatus for producing a magnetic coupling effect.

A still further object is the provision of a device of the character indicated which gives prompt acceleration to the driven shaft to assure quick starting characteristics or fast pick-up.

Another object is that of providing a simple and effective elastic, speed-change coupling for operation between such a prime mover as a vehicle engine of the internal combustion type, and a driven portion, illustratively, the drive-shaft and wheels of the vehicle.

A further object of the present invention is the provision of a flexible connection between the engine and the driven shaft of an automobile which connection enables the engine to run at higher speeds on grades and heavy load and substantially eliminates stalling under stopping and starting conditions and, generally, promotes smoother driving.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated in the accompanying drawings in which.

Like reference characters denote like parts in the several figures of the drawings.

Figure 1:
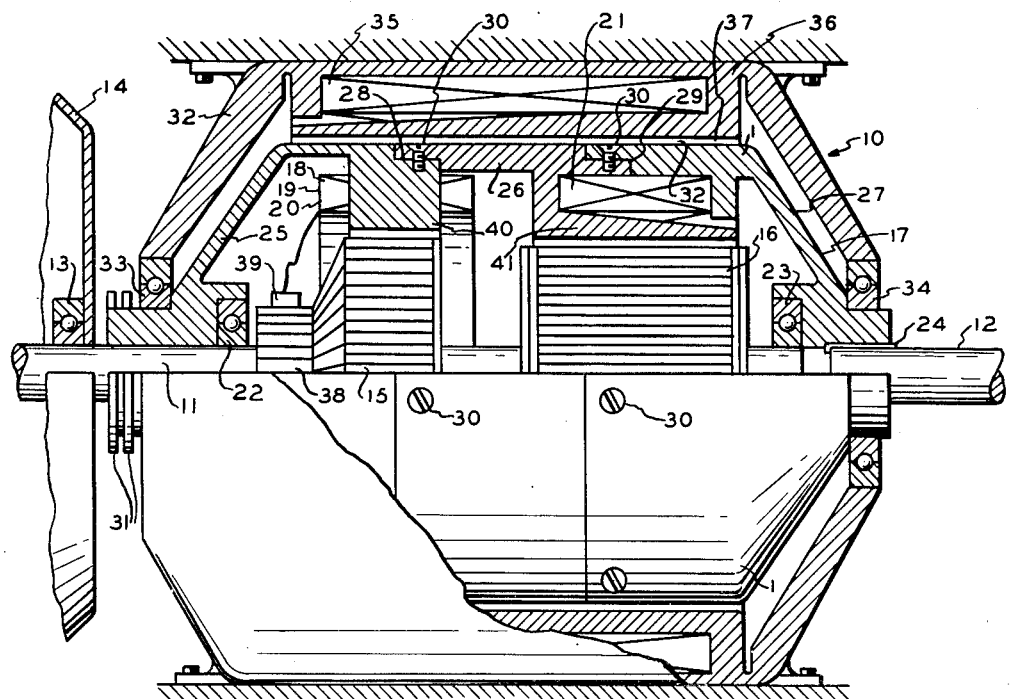
Figure 1 is a view of the present device taken transversely of the driving and driven shafts and with portions broken away to facilitate understanding.

Referring first to Figure 1, which illustrates a preferred mechanical embodiment of the invention, the power transmission, generally designated 10, is shown connected between a driving shaft 11, such as the crankshaft of a vehicle internal combustion engine, and a driven shaft 12 leading as through a gear box (not shown) to the load, which load for example may be imposed on the driving wheels of a vehicle. The driving shaft 11 is shown extending through a bearing 13 attached to an engine wall 14. Fastened to the driving shaft 11 and concentric with the axis thereof are an exciter armature 15 and a magnetic drive rotor 16. Surrounding the armature 15 and the rotor 16 is a driven housing 17 supporting on its inner surface a plurality each of exciter field coils 18, 19, and 20 and a single inductor-type field coil 21 of the magnetic drive. The housing 17 is rotatably carried on the driving shaft 11 by means of bearings 22 and 23 and is fixed to the driven shaft 12 by such means as key 24. The housing conveniently is of iron or steel of magnetic grade and for example is made up of a forward section 25, an intermediate section 26, and a rearward section 27 joined together by interlocking surfaces at 28 and 29 and locked together by screws 30, or the like. The forward portion 25 of the housing 17 is provided with slip rings 31 as will be more fully explained hereinafter. Surrounding the driven housing 17 is the brake housing 32, made for example of the same material as the latter. This brake housing is fixed relative to the mounting of the prime mover; in the case of an automobile, for instance, it would conveniently be bolted to the chassis. The housing 17 is freely revolvable within the housing 32 because of bearings 33 and 34 interposed therebetween. In other words, the housing 17 is rotatably supported from inside on the driving shaft 11 and on the outside within the brake housing 32. The inside of the brake housing 32 is provided with a brake coil 35 and a core 36 therefor which surrounds the housing 17 with a small air gap 37 therebetween.

The armature 15 of the exciter preferably is of the type commonly used in direct current generators and has a commutator 38. The commutator is provided with brushes 39 which are connected to the coils 19 and 20 in a manner to be described later. The coils 18, 19 and 20 are wrapped around cores 40 which are integral with portion 25 of the driven housing 17 and partake of its motion.

The rotor 16 of the magnetic drive illustratively is of the type used in squirrel-cage induction motors, and its field is provided by coil 21 which is supported on a core 41 made up in two halves, each half integral with one of the intermediate portions 26 and the rearward portion 27, respectively, of the driven housing 17. The core 41 is hollow and carries the coil 21 within it, said coil being wound substantially concentrically with the axis of the shafts 11 and 12. Generally speaking, then, the exciter elements, that is, the armature 15, the commutator 38, brushes 39, coils 18, 19 and 20, and the cores 40 make up a direct current generator, while the magnetic drive elements, that is, the rotor 16, the coil 21, and the core 41 make up a device similar to a squirrel cage induction motor which is furnished with current from the exciter. The armature of the exciter and the rotor of the magnetic drive are preferably placed on the driving shaft, rather than the field systems, so that parts of lower $WR^2$ will be on the high-speed shaft. The elements of the driven housing 17, coil 35, and core 36 make up another electromagnetic device, the purpose of which will be more fully explained hereinafter.

Figure 2:
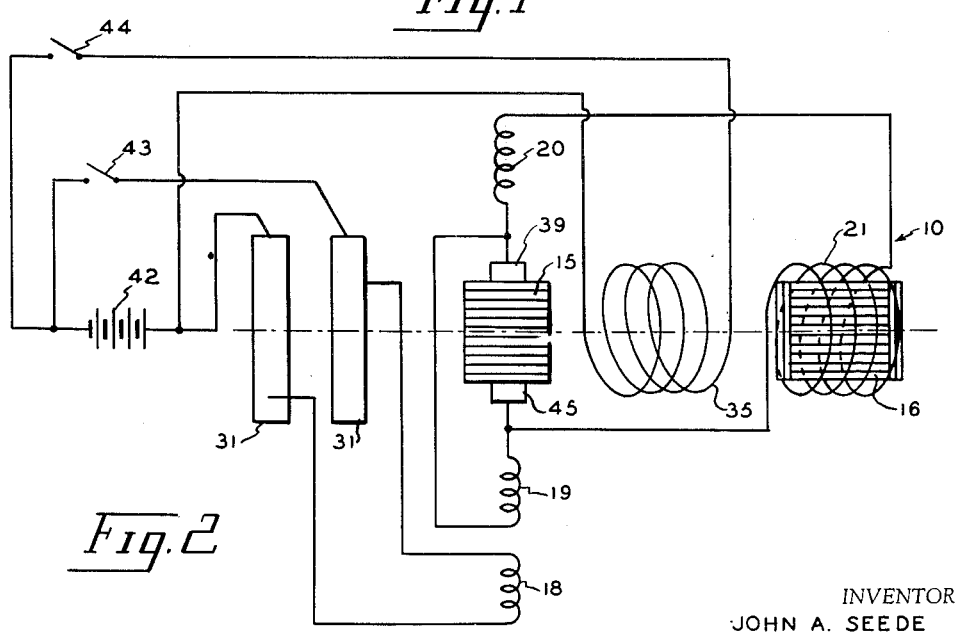
Figure 2 is a schematic diagram of the electrical components of the present invention.

The electrical connections and arrangement of the parts of the invention are best shown in Figure 2. The armature 15 is provided with separately powered field coils 18 which are connected through slip rings 31 to a battery 42, say the battery of an automobile, one of the leads to the battery being provided with a switch 43. In certain embodiments of the present invention the switch 43 is connected to the accelerator pedal of the engine so that current will flow through coils 18 whenever the operator desires acceleration. Across commutating brushes 39 and 45 of the exciter are connected the shunt field coils 19. In this connection it should be noted that at times if desired a third slip ring 31, not shown, is provided along with a rheostat for control and adjustment of shunt coils 19.

The series field coils 20 are connected on one side to the brush 39 while the other side is connected to one side of the field coil 21 of the magnetic drive. The other side of the coil 21 is connected to the brush 45 to complete the load circuit of the exciter. The direct current generator is, thus, compound wound, for reasons to be discussed later. Coil 35 is connected directly to the battery 42 with a switch 44 in one of the leads.

In operation, the driving shaft 11 carries the armature 15 with it. This generates current in the armature coils and causes a current to flow in the field coil 21 of the magnetic drive. The inductor-type coil sets up a magnetic flux which passes through the iron in the rotor and induces current in the conducting bars of the rotor, thus setting up forces which tend to reduce the difference in speeds of the rotor and the driven housing to zero. The housing 17 will be further caused to turn by the reaction between the armature 15 and the field coils 18, 19 and 20.

Now, as has been noted, the exciter is self-excited through coils 19 and 20. Since simple self-excited direct current generators are slow to come up to rated voltage because of the fact that there is no field to cause current to flow in the armature to supply current to the field coils, and so on, externally powered field coils 18 are provided. Thus, when the operator wishes to connect the engine with the load, he closes the switch 43 and the battery 42 furnishes current to the coils 18 producing a field within which the armature 15 turns. The passage of the armature coils through the field produced by the coils 18 causes a flow of current therein, whereby current flows through the shunt field coils 19 and the series field coils 20. In very little time, the exciter is generating its rated current and the magnetic drive is fully actuated.

Coil 35 and its core 36 surround the driven housing 17, the latter thus being treated as a rotor. This combination of elements is used for example to supplement the ordinary brakes of a vehicle. The switch 44 is closed by the operator of the vehicle, such as in pressing on the brake pedal, and direct current from the battery 42 flows in the coil 35, setting up an electromagnetic field. This field induces eddy-currents in the driven housing 17; the net result is that the housing 17 magnetically has a tendency to become fixed with relation to the coil 35, whereby electromagnetic braking results.

As has been stated, both the exciter and the magnetic drive contribute to the torque delivered to the propeller shaft. Generally speaking, the proportion contributed by the exciter preferably is kept relatively small, since the more rugged magnetic drive construction will permit of operation at higher temperatures. The economy in weight resulting from letting the magnetic drive carry the load thus for example stands as an advantage.

The exciter voltage and the torque developed between the engine shaft and the propeller shaft will depend on difference in speed between the elements of the magnetic drive and the design of the exciter. This becomes clear upon considering that the current in the magnetic drive coil will vary as the exciter armature voltage varies. In other words, when the driven housing 17 begins to rotate at a speed which is closer and closer to that of the driving shaft 11 and the rotor 16, the difference in speed between the armature 15 and the field of the exciter gets less and less, which results in less current being generated in the exciter and less current flow in the coil of the magnetic drive and, thus, less torque being transmitted to the driven housing and shaft. The total torque, that is, exciter and magnetic drive torque will follow closely changes in exciter voltage, and, so, a close pre-determination of car and engine speed relations is permitted with this device.

It should be noted that the present device will have a braking effect during deceleration of the vehicle. When delivering power to the transmission the driving shaft revolves faster than the driven shaft, the difference in torque depending upon the requirements of the driving conditions; when overdriven, as when the engine is used in braking, the engine shaft becomes the driven element and revolves slower than the propeller shaft, while the exciter and magnetic drive produce a braking effect.

It should be noted that the series coils 20 are present to maintain exciter armature volts against exciter armature reaction and to obtain quick changes in exciter excitation with sudden changes in load demands. For control of these series coils the self-excited shunt coils 19 preferably oppose the series coils 20. With a sudden increase in load, the series field will jump the exciter volts quickly and the exciter armature current increases and as relatively stable conditions are reached, the opposing excitation of the shunt coils will restore the excitation to that value which corresponds to that difference in speed between driving and driven elements.

While certain novel features of the invention have been shown and described and are pointed out in the annexed claims, it will be understood that various omissions, substitutions, and changes in the forms and details of the device illustrated and in its operation may be made by those skilled in the art without departing from the spirit of the invention or the scope of the appended claims.

Having thus described my invention, what I claim as new and desire to secure by Letters Patent is:

1. A power transmission, comprising, a rotatable shaft and a separately rotatable field winding support, a direct current generator having an armature on said shaft and a field winding on said support including compound self-excited series and shunt portions respectively in series and in shunt relation to said armature and having a separately-excited field winding portion for prompt excitation of said self-excited portions, and a magnetic drive, said drive including a rotor on said shaft, and a corresponding field winding on said support rotatable with said support and generator field winding and connected in electrically energized series relation to said series field portion of said generator field winding to produce a magnetic drag on said rotor when energized by said generator.

2. A power transmission, comprising, a rotatable shaft and a separately rotatable field winding support, a direct current generator including an armature and a corresponding field winding on said support, and a magnetic drive disposed longitudinally of said shaft from said generator, said drive including a bar cage rotor on said shaft rotatable with said armature and shaft, and a corresponding field coil substantially coaxial with said rotor on said support and rotatable with said support and generator field winding and connected in electrically energized relation to the latter to produce magnetic drag on said rotor when energized by said generator.

3. A power transmission wherein the driving and driven shafts are axially aligned, comprising, a housing supported for relative rotation on one of said shafts and secured to the other of said shafts for rotating therewith, a direct current generator whose armature is inside said housing and on said shaft rotatably supporting the housing and whose field winding is inside said housing and secured to the same for rotating therewith, and a magnetic drive disposed longitudinally of said generator on said shaft supporting the generator armature, and including a rotor inside said housing and attached to said armature shaft to rotate with the same, and a field coil inside said housing connected in electrically energized relation with said generator and rotatable with said housing and generator field winding to produce magnetic drag on said rotor when energized by the generator.

4. A power transmission wherein the driving and driven shafts are axially aligned, comprising, a generally cylindrical housing supported for relative rotation on one of said shafts and secured to the other of said shafts for rotating therewith a direct current generator whose armature is inside said housing and on said shaft rotatably supporting the housing and whose field winding is inside said housing and secured to the same for rotating therewith, a magnetic drive disposed longitudinally of said generator on said shaft supporting the generator armature, and including a rotor inside said housing and attached to said armature shaft to rotate with the same, and a field coil inside said housing connected in electrically energized relation with said generator and rotatable with said housing and generator field winding to produce magnetic drag on said rotor when energized, and an induction brake winding support journaled to said housing and having an induction winding secured thereto for exerting magnetic drag on said housing.

5. An automobile transmission, comprising, an armature for a direct current generator attached to the engine drive shaft, a rotor for a magnetic drive also attached to the engine drive shaft, a housing rotatably mounted concentrically with the armature and rotor and bearing a field winding for the generator and an induction winding for the magnetic drive, slip rings on said housing connected with a portion of the field winding of the generator, said slip rings being connected with the battery of the automobile through a switch, brushes abutting the commutator of said armature, another portion of the generator field winding being connected across the brushes in shunt to said armature, still another portion of the field winding of said generator being connected in series with the induction field winding of said magnetic drive and said armature, and an induction brake winding surrounding the housing and fixed relative to the automobile chassis, said brake winding being connected to the battery of the automobile through a switch.

6. A power transmission wherein the drive shaft and the driven shaft are axially aligned, comprising, a housing rotatably and concentrically borne by said drive shaft and secured to said driven shaft to rotate therewith, a magnetic drive contained within said housing and having a bar cage rotor attached to the driving shaft for rotating with the same, and an induction field coil substantially coaxial with said rotor and attached to said housing for rotating with the latter, and a direct current generator having an armature on said drive shaft for rotating with said shaft and rotor and having a field winding in electrical energizing relation to said induction field coil and rotatable with said housing and coil.

7. A power transmission, comprising, a rotatable shaft and a separately rotatable field winding support, a direct current generator including an armature on said shaft and having a corresponding field winding on said support, and a magnetic drive including a rotor on said shaft and rotatable with said shaft and armature and having a field winding on said support rotatable with said support and generator field winding and connected in energized relation to the latter to produce magnetic drag on said rotor when energized by said generator.

8. A power transmission, comprising, a rotatable shaft and a separately rotatable field winding support, a direct current generator including an armature and a corresponding field winding on said support, and a magnetic drive disposed longitudinally of said shaft from said generator, said drive including a rotor on said shaft rotatable with said armature and shaft, and a corresponding field winding on said support rotatable with said support and generator field winding and connected in electrically energized relation to the latter to produce a magnetic drag on said rotor when energized by said generator.

9. A power transmission, comprising, a rotatable shaft and a separately rotatable field winding support, a self-excited direct current generator having an armature on said shaft and a compound field winding on said support including portions in series and in shunt with said armature, and a magnetic drive disposed longitudinally of said shaft from said generator, said drive including a rotor on said shaft rotatable with said armature and shaft, and a corresponding field winding on said support rotatable with said support and generator field winding and connected in electrically energized series relation to the series field portion of said generator field winding to produce a magnetic drag on said rotor when energized by said generator.

10. A power transmission, comprising, a rotatable shaft and a separately rotatable field winding support, a direct current generator having an armature on said shaft and a field winding on said support including compound self-excited series and shunt portions respectively in series and in shunt relation to said armature, and a magnetic drive, said drive including a bar cage rotor on said shaft rotatable with said armature and shaft, and a corresponding field coil substantially coaxial with said rotor on said support and rotatable with said support and generator field winding and connected in series with said series portion of the latter to produce magnetic drag on said rotor when energized by said generator.

11. A power transmission, comprising, a rotatable shaft and a separately rotatable field winding support, a direct current generator including an armature on said shaft and a corresponding field winding on said support, and a magnetic drive including a rotor on said shaft rotatable with said armature and shaft, and a corresponding field winding on said support having a magnetically separate field of influence from said generator field winding and connected in electrically energized relation to the latter to produce magnetic drag on said rotor when energized by said generator.

JOHN A. SEEDE.

REFERENCES CITED

The following references are of record in the file of this patent:

UNITED STATES PATENTS

| Number | Name | Date |
|---|---|---|
| 1,979,435 | Barnett | Nov. 6, 1934 |
| 2,284,546 | Von Ohlsen | May 26, 1942 |
| 2,317,290 | McIlvried | Apr. 20, 1943 |
| 2,411,122 | Winther | Nov. 12, 1946 |